Jan. 18, 1966 L. N. PLISK ETAL 3,229,370

VARIABLE POWER TELESCOPE RETICLE AND
METHOD OF MAKING THE SAME
Filed Feb. 7, 1962

LEONARD N. PLISK
KENNETH A. SNOW
*INVENTORS*

BY Frank C. Parker

ATTORNEY 3,229,370

VARIABLE POWER TELESCOPE RETICLE AND METHOD OF MAKING THE SAME

Leonard N. Plisk, Hilton, and Kenneth A. Snow, Greece, N.Y., assignors to Bausch & Lomb Incorporated, Rochester, N.Y., a corporation of New York Filed Feb. 7, 1962, Ser. No. 171,642
11 Claims. (Cl. 33—50)

This invention relates generally to variable power optical systems for sighting instruments such as telescopes and more particularly to improvements in sighting reticles used in such instruments.

In Benford Pat. No. 2,800,718, there is disclosed a reticle for variable power sighting instruments comprising a plurality of tapered indicia which meet at a common point on the optical axis of the instrument, thereby providing a reticle which appears to be of substantially the same shape and size regardless of the degree of magnification being provided at the time by the instrument.

The present invention also relates to tapered reticles but is more particularly concerned with the provision of an improved reticle utilizing at least a pair of crossed devices wherein each of the crossed devices comprises two extremely acute angularly spaced strands forming narrow wedge-shaped indicia extending across the substantial focal plane of the optical system so that each of the crossed devices forms opposed tapered indicia which appear to meet at a common point.

It is therefore a principal object of the present invention to provide an improved reticle for sighting instruments comprising at least a pair of crossed devices, each of which includes two extremely acute angularly spaced strands forming narrow wedge-shaped indicia extending across the substantial focal plane of the optical system in order to provide a reticle which appears substantially the same whether the telescope in which the reticle is being used is at low magnification or at high magnification.

The present invention also contemplates that the spaces between each two extremely acute angularly spaced intersecting strands, wires or wire-like members may be filled with a material which will adhere to the strands, wires or wire-like members and which at least partially prevents the passage of light rays therethrough.

A further object of the invention is to provide a telescope reticle comprising at least one diverging indicium formed by a pair of extremely acute angularly spaced strands having a material disposed therebetween which adheres to the strands and which at least partially prevents the passage of light rays therethrough.

A still further object of the invention is to provide an improved method of making reticles of the type disclosed herein.

A principal advantage of the present invention stems from the economies of manufacture which may be effected by the use of reticles such as are disclosed herein.

The foregoing and other objects and advantages of the present invention will become more apparent from the following detailed description when read in conjunction with the accompanying drawing, wherein.

Figure 1:
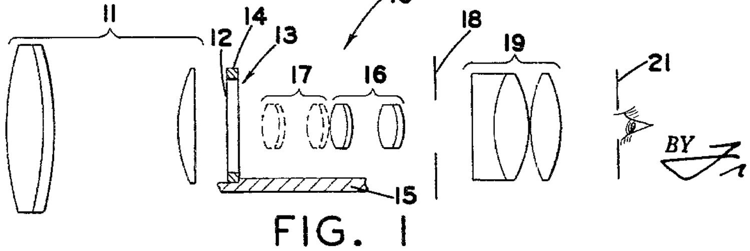
FIG. 1 is a diagrammatic view of a variable power telescope embodying one form of the present invention.

With reference now to FIG. 1 of the drawing, one form of the invention is shown as being embodied in a variable power gun sighting telescope 10. The telescope 10 includes an objective lens group 11 which focuses an image of the target area or field at a front surface 12 of a reticle 13. The reticle 13 will be described in greater detail hereinafter and comprises an outer ring 14 which seats against a casing or barrel 15. To the rear of the reticle 13 there is a suitable erector lens system 16 which is movable longitudinally within casing 15 in order to vary the power or magnification of the telescope. The dotted lines 17 represent the forward or high power position of the erector lens system 16 and the solid lines represent the low power position. An image of the target and reticle is relayed by the erector lens 16 to the focal plane 18 where it is viewed through an eyepiece 19 by the operator's eye located at the exit pupil 21 of the telescope 10.

Figure 2:
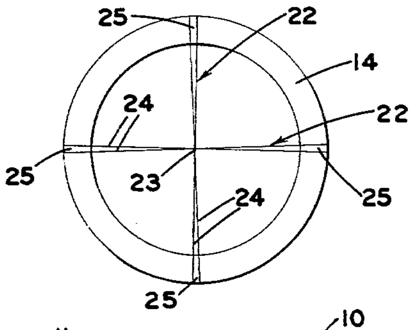
FIG. 2 is an enlarged view of one form of reticle comprising the subject matter of the present invention.

According to the present invention, the front surface 12 of the reticle 13 is disposed at a focal plane of the instrument and the reticle 13, as already stated, comprises a support ring 14. The reticle 13 in FIG. 2 also includes at least a pair of crossed devices 22. The crossed devices 22 each intersect at the approximate optical axis of the instrument, designated by reference numeral 23, and each of the crossed devices 22 comprises a pair of extremely acute angularly spaced strands, wire-like members, or wires 24. The strands or wires 24 are each fastened, as by cementing or soldering for example, to the support ring 14 at the periphery at points 25 and are thus retained in taut condition so that the point of intersection 23 will remain substantially fixed. With the crossed devices 22 as shown in FIG. 2, they together present a reticle form which comprises a plurality of tapered indicia which appear to meet at a common point. Consequently, the reticle appears to be of substantially the same size regardless of the degree of magnification being provided at the moment by the telescope.

Figure 3:
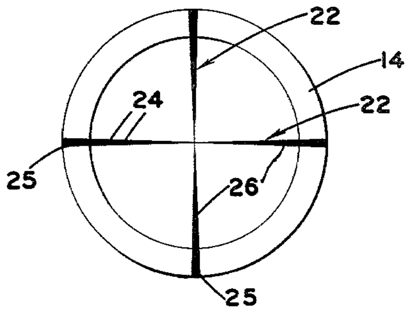
FIG. 3 is an enlarged view similar to FIG. 2 and illustrating a reticle formed with a filling material disposed between the angularly spaced strands of which the reticle is composed.

In the embodiment of the reticle disclosed in FIG. 3, the crossed devices also comprise pairs of extremely acute angularly spaced strands or wires forming narrow wedge-shaped indicia which are fastened to the support ring at 25 and in this form of the reticle, a filler material 26 is disposed in the spaces between the extremely acute angularly spaced strands or wires 24. The wires or strands may be made of stainless steel or nickel, each of which has been found to be particularly suitable, however, it is to be understood that strands of other materials, not necessarily metals, could likewise be employed. The filler material may comprise a rubber compound, an epoxy cement or lacquer, for example. It is similarly not intended that the filler material will be limited to these enumerated materials as it is contemplated that the only thing really essential is that the filler material partly restrict the passage of light and be able to adhere to the strands 24.

It is to be understood that reticles of different over-all configuration but utilizing the teaching disclosed herein may be made without departing from the scope of the present invention.

Figure 4:
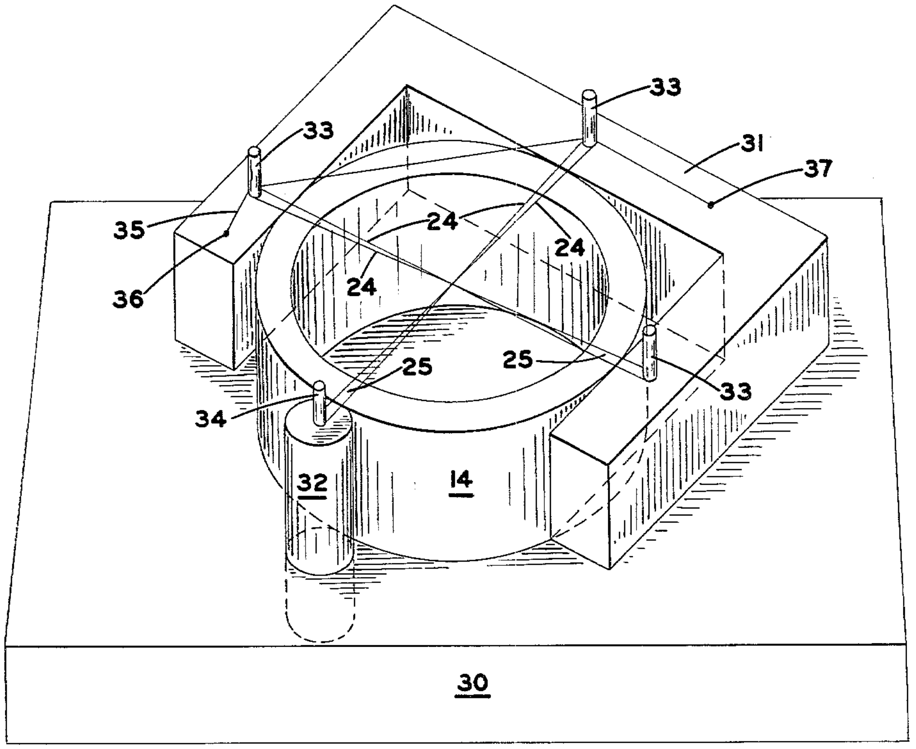
FIG. 4 is a fragmentary view of a fixture whereby reticles of the type disclosed herein can be made.

With reference to FIG. 4, an exemplary fixture is disclosed for forming the reticles 13. In this fixture a base 30 is provided on which is mounted a U-shaped frame member 31. The U-shaped frame member 31 is sized so as to receive the support ring 14 therein. A post 32 removably secured to the base 30 may be employed for retaining the support ring 14 tightly within the fixture. The member 31 is provided with three pins 33 and the post 32 is provided with a fourth pin 34. It will be understood that the locations of pins 33 and 34 are such that lines connecting the opposite of these pins intersect at the substantial midpoint within support ring 14. In the use of the fixture 31, one end 35 of a strand 24 may be secured at point 36 and wound around the pins 33 and 34 in the fashion disclosed in FIG. 4 with the other end of the strand being secured at point 37 with the strand being placed under the desired degree of tension. It will be understood to be within the scope of the present invention to utilize an assembly fixture wherein a plurality of reticle mounts may be disposed in a row with the wires or strands being extended across a plurality of reticle mounts at the same time. The strands 24 lie across the top of support ring 14 and it is only necessary to fasten, by cementing or soldering, the strands to the top of the support ring 14 by the application of a dab of cement at points 25 or by suitable solder technique in order to hold the strands 24 in place on the support ring 14. If it is desired to construct the reticle as shown in FIG. 3, either a small amount of the cement which is used or some other material may be applied to the spaces between the strands. It has been found that material of this sort readily flows along the strands to completely fill the narrow tapered spaces between the strands.

It will be understood that modifications of the present invention may be made without departing from the spirit or scope thereof.

What is claimed is:

1. A reticle for a telescope comprising at least one diverging indicium formed by a pair of closely angularly spaced strands having a material disposed therebetween which adheres to the strands to form a slender wedge shape, and which at least partially prevents the passage of light rays therethrough although the obscuration of the target is minimal.

2. A reticle for a telescope comprising a plurality of diverging indicia, at least certain of said indicia being formed in the shape of a slender wedge, said indicia consisting of closely angularly spaced intersecting strands extending across the reticle whereby said indicia appear to meet at a common point and obscuration of the target is minimal.

3. A reticle secured substantially in the focal plane of a sighting telescope and centered on the optical axis thereof and comprising at least a pair of crossed devices, each of said pair of crossed devices comprising two closely angularly spaced wires intersecting each other at approximately said optical axis and forming the borders of indicia means whereby each of said crossed devices forms a pair of slender opposed tapered indicia which appear to meet at a common point.

4. A reticle for disposition substantially in the focal plane of the optical system of a sighting instrument and comprising a plurality of wire-like devices, each of said wire-like devices comprising a pair of closely angularly spaced intersecting wire-like members lying substantially in said focal plane and forming the borders of indicia means, and a material which adheres to the wire-like members and which at least partially prevents the passage of light rays therethrough said material filling each of said angular spaces between the intersecting wire-like members to form a slender wedge whereby each pair of said wire-like members together with the fill material therebetween forms opposed tapered indicia which appear to meet at a common point.

5. A reticle for disposition substantially in the focal plane of the optical system of a variable power telescope and comprising at least a pair of crossed devices, each of said crossed devices comprising a set of two closely angularly spaced slender intersecting strands lying substantially in said focal plane and forming the edge portions of the indicia means, and a light occluding material adhered to and between the two intersecting strands of each set so as to substantially completely fill said angular spaces, whereby each set of two of said strands together with the fill material therebetween forms opposed slender tapered indicia which appear to meet at a common point.

6. A reticle for disposition substantially in the focal plane of the optical system of a sighting instrument and comprising at least a pair of crossed devices, each of said crossed devices comprising a set of two closely angularly spaced intersecting wires lying in said focal plane, an opaque material substantially completely filling said angular spaces between the intersecting wires of each set, said material adhering to the wires wherely each set of two wires together with the fill material therebetween forms opposed slender tapered indicia which appear to meet at a common point.

7. In a variable power telescope having a reticle located substantially in the focal plane thereof, the combination in said reticle of a plurality of slender radially diverging indicia meeting in the approximate center of the reticle, each of said indicia comprising a pair of closely angularly spaced wires intersecting each other at the approximate optical axis of the telescope so as to form the edge portions of indicia means, and a material which adheres to the wires and substantially completely fills the spaces between the angularly spaced wires and at least partially prevents the passage of light rays therethrough.

8. A reticle for a telescope comprising a plurality of radially diverging indicia, each of said indicia being formed by a pair of extremely acute angularly spaced strands forming narrow wedge-shaped indicia having a material disposed therebetween which adheres to the strands and which at least partially prevents the passage of light rays therethrough whereby target obscuration is of minimal amount.

9. A reticle for disposition substantially in the focal plane of the optical system of a sighting instrument and comprising a plurality of wire-like devices, each of said wire-like devices consisting of a pair of extremely acute angularly spaced intersecting wire-like members forming the borders of a slender indicium, said members lying in the substantial focal plane of the optical system whereby each pair of said wire-like members forms opposed tapered indicia which appear to meet at a common point.

10. A reticle for disposition substantially in the focal plane of the optical system of a sighting instrument and comprising at least a pair of crossed devices, each of said crossed devices consisting of two strands which are inclined to each other at an extremely acute included angle and form the marginal parts of slender tapered indicia whereby each of said crossed devices forms two opposed tapered indicia which appear to meet at a common point.

11. A reticle for disposition substantially in the focal plane of the optical system of a sighting instrument and comprising at least a pair of crossed devices, each of said crossed devices consisting of two wires which are extremely acute angularly spaced and form the marginal parts of an even number of slender indicia whereby each of said crossed devices forms opposed tapered indicia which appear to meet at a common point.

References Cited by the Examiner

UNITED STATES PATENTS

| | | | |
|---|---|---|---|
| 2,466,724 | 4/1949 | Meyer | 33—50.5 |
| 2,566,590 | 9/1951 | Trippi | 33—47 |
| 2,601,726 | 7/1952 | Myers | 33—50.5 |
| 2,909,838 | 10/1959 | Kollmorgan | 33—50.5 |
| 2,961,759 | 11/1960 | Weissflock | 29—452 |
| 3,032,868 | 5/1962 | Billner | 29—452 |

ISAAC LISANN, *Primary Examiner.*